US012573369B2

(12) United States Patent
Asai et al.

(10) Patent No.: US 12,573,369 B2
(45) Date of Patent: Mar. 10, 2026

(54) METHOD FOR CONTROLLING UTTERANCE DEVICE, SERVER, UTTERANCE DEVICE, AND PROGRAM

(71) Applicant: Panasonic Intellectual Property Management Co., Ltd., Osaka (JP)

(72) Inventors: Sara Asai, Osaka (JP); Satoru Matsunaga, Osaka (JP); Hiroki Urabe, Osaka (JP); Masahiro Ishii, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 597 days.

(21) Appl. No.: 17/765,668

(22) PCT Filed: Aug. 20, 2021

(86) PCT No.: PCT/JP2021/030644

§ 371 (c)(1),
(2) Date: Jan. 22, 2024

(87) PCT Pub. No.: WO2022/215284

PCT Pub. Date: Oct. 13, 2022

(65) Prior Publication Data

US 2024/0221720 A1 Jul. 4, 2024

(30) Foreign Application Priority Data

Apr. 9, 2021 (JP) ................................ 2021-066716

(51) Int. Cl.
*G10L 13/033* (2013.01)

(52) U.S. Cl.
CPC ................................ *G10L 13/033* (2013.01)

(58) Field of Classification Search
CPC ................................ G10L 13/033; G06F 3/167
See application file for complete search history.

(56) References Cited

U.S. PATENT DOCUMENTS 9,123,339 B1 * 9/2015 Shaw ...................... G10L 15/22
10,565,989 B1 * 2/2020 Wheeler ................. G06F 3/167
(Continued)

FOREIGN PATENT DOCUMENTS

JP 2006-126548 5/2006
JP 2006126548 A * 5/2006
(Continued)

OTHER PUBLICATIONS

Notice of Reasons for Refusal issued May 14, 2024 in counterpart Japanese Patent Application No. 2023-060786, with English machine translation.

(Continued)

*Primary Examiner* — Anne L Thomas-Homescu
(74) *Attorney, Agent, or Firm* — Wenderoth, Lind & Ponack, L.L.P.

(57) ABSTRACT

A method for controlling an utterance device, a server (10), an utterance device (20), and a program control the utterance device (20). The server (10) receives utterance source information from an information source device (40), and set the utterance device (20) based on the utterance source information. Then, the server (10) provides an utterance sound source that has a sound source characteristic according to the utterance device (20) to the utterance device (20), and causes the utterance device (20) to utter using the utterance sound source.

15 Claims, 12 Drawing Sheets

(56) References Cited

U.S. PATENT DOCUMENTS

| | | | | |
|---|---|---|---|---|
| 2020/0126566 | A1 * | 4/2020 | Wang | G10L 17/06 |
| 2020/0388268 | A1 | 12/2020 | Saito | |

FOREIGN PATENT DOCUMENTS

| | | | | |
|---|---|---|---|---|
| JP | 2009-139390 | | | 6/2009 |
| JP | 2010-048959 | | | 3/2010 |
| JP | 2010048959 | A | * | 3/2010 |
| JP | 2015-164251 | | | 9/2015 |
| JP | 2016-062077 | | | 4/2016 |
| JP | 2016062077 | A | * | 4/2016 |
| JP | 6640266 | | | 2/2020 |
| JP | 2021-002062 | | | 1/2021 |
| JP | 2021002062 | A | * | 1/2021 |
| WO | 2015/129523 | | | 9/2015 |
| WO | 2019/138652 | | | 7/2019 |

OTHER PUBLICATIONS

International Search Report issued Oct. 19, 2021 in International (PCT) Application No. PCT/JP2021/030644.

Office Action issued Feb. 14, 2023 in counterpart Japanese Application No. 2022-519353, with machine translation.

Translation of the International Preliminary Report on Patentability issued Oct. 19, 2023 in International Application No. PCT/JP2021/030644.

* cited by examiner

METHOD FOR CONTROLLING UTTERANCE DEVICE, SERVER, UTTERANCE DEVICE, AND PROGRAM

TECHNICAL FIELD

The present disclosure relates to an utterance device, and more particularly, to a method for controlling an utterance device, a server, an utterance device, and a program.

BACKGROUND ART

A home appliance is an abbreviation of an electric appliance for home, and is, for example, an electric apparatus such as a television, a refrigerator, an air conditioner, a washing machine, a cleaning robot, an acoustic device, a lighting, a water heater, and an intercom used in home. Conventionally, a beep sound or a buzzer sound is used to notify a user of an operation status of a home appliance. For example, when washing of a washing machine is finished, when an air conditioner is started, or when the door of a refrigerator is not completely closed for a predetermined time or more, these home appliances beep to attract user's attention.

Currently, in order to convey more information to the user of a home appliance instead of a beep sound or the like, a home appliance as an utterance device capable of uttering by using voice including a human language has been developed. Such a home appliance is called an utterance home appliance. Instead of a beep sound, the home appliance notifies the user of information relating to the home appliance by uttering, for example, "washing is finished" or "the door of the refrigerator is not closed".

PRIOR ART DOCUMENTS

Patent Documents

Patent Document 1: Japanese Patent No. 6640266

SUMMARY

Problems to be Solved

Patent Document 1 discloses a message notification control system that causes a home appliance (controlled device electronic device) having an utterance function to utter. Specifically, the user registers a condition for utterance desirably made by a home appliance, via a user intention registration application of a terminal device. The message notification control system detects a state of a home appliance, and causes the home appliance to utter a message in a case where the detected state satisfies a registered condition (for example, a refrigerator is open).

However, the message notification control system of Cited Document 1 causes even a different home appliance to utter using the same sound source as long as the same condition is satisfied, regardless of a situation of the home appliance and a situation of the user. It can be said that there is room for improvement in providing a sound source suitable for a home appliance that utters.

An object of the present disclosure is to provide a technique capable of providing a sound source suitable for an utterance device so that an utterance can be easily heard.

Means for Solving the Problems

In order to solve the above-described problem, the present disclosure provides a method for controlling an utterance device, a server, an utterance device, and a program.

A method for controlling an utterance device according to an aspect of the present disclosure includes: receiving utterance source information from an information source device, setting an utterance device based on the utterance source information, providing an utterance sound source that has a sound source characteristic according to the utterance device to the utterance device, and causing the utterance device to utter using the utterance sound source.

Further, a server that controls an utterance device according to another aspect of the present disclosure includes a server storage and a server controller. The server storage stores a sound source that can be provided to the utterance device. The server controller is configured to: receive utterance source information from an information source device, set an utterance device based on the utterance source information, provide an utterance sound source that has a sound source characteristic according to the utterance device to the utterance device, and cause the utterance device to utter using the utterance sound source.

Further, an utterance device according to another aspect of the present disclosure is an utterance device capable of making utterance, and includes a device storage and a device controller. The device storage stores at least one of a type, an identifier, utterance performance, an operating state, a location, and a distance to the user of the utterance device; user information of the user of the utterance device; and arrangement of a speaker of the utterance device. The device controller is configured to: set a sound source characteristic suitable for the utterance device based on at least one of the type, the identifier, the utterance performance, the operating state, the location, and the distance to a user of the utterance device, the user information of a user of the utterance device, and the arrangement of a speaker of the utterance device, make an inquiry to a server by using the set sound source characteristic, acquire an utterance sound source that has the sound source characteristic from the server, and utter using the utterance sound source.

Further, a program according to another aspect of the present disclosure is a program used in a terminal that communicates with a server that controls an utterance device or the utterance device.

Effects

In the present disclosure, according to a method for controlling an utterance device, a server, and an utterance device, the discomfort given to the user by utterance of the utterance device can be reduced, and convenience of the utterance device can be improved.

DETAILED DESCRIPTION

Figure 1:
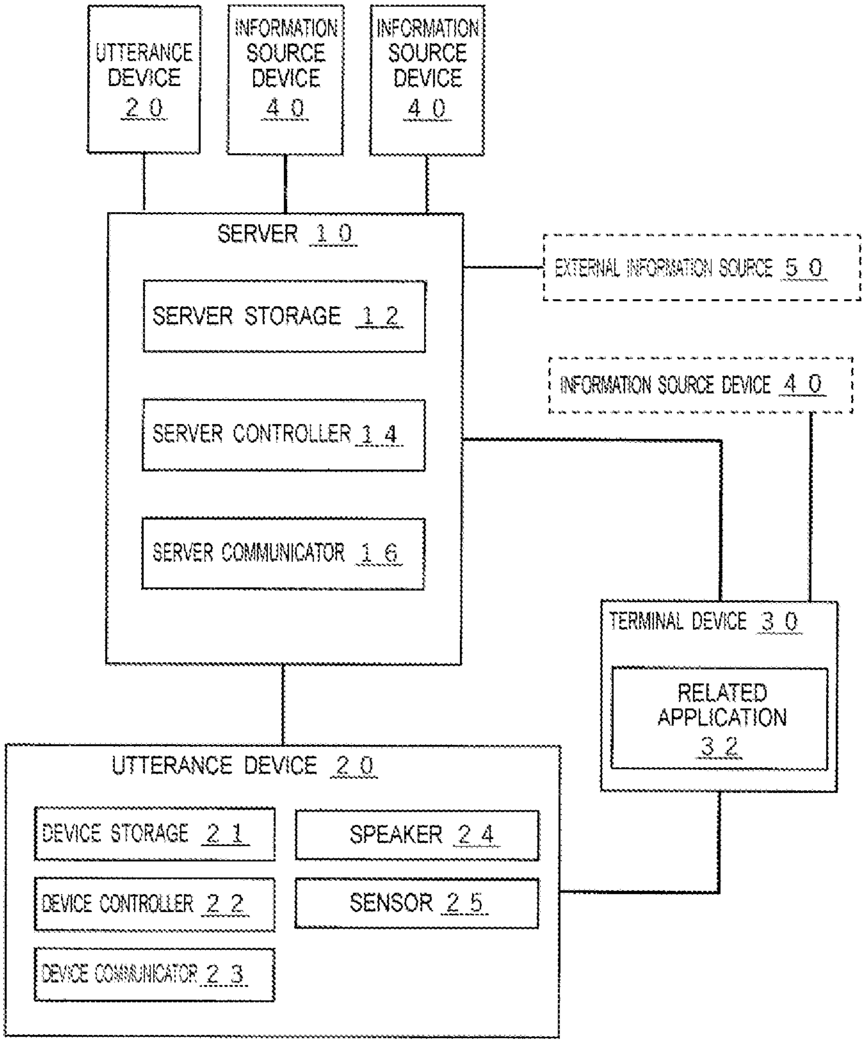
FIG. 1 is a block diagram illustrating a schematic configuration of an utterance device and a server that controls the utterance device in a first embodiment.

First, various aspects of a method for controlling an utterance device, a server, and an utterance device will be described.

A method for controlling an utterance device according to a first aspect of the present disclosure includes: receiving utterance source information from an information source device, setting an utterance device based on the utterance source information, providing an utterance sound source that has a sound source characteristic according to the utterance device to the utterance device, and causing the utterance device to utter using the utterance sound source.

In the method for controlling an utterance device according to a second aspect of the present disclosure, in the first aspect, the sound source characteristic may be set based on at least one of a type, an identifier, utterance performance, an operating state, a location, and a distance to a user of the utterance device; user information of a user of the utterance device; and arrangement of a speaker of the utterance device.

In the method for controlling an utterance device according to a third aspect of the present disclosure, in the first or second aspect, the sound source characteristic may include at least one of a format of voice data, a timbre characteristic, a sound quality characteristic, a volume, and utterance content.

In the method for controlling an utterance device according to a fourth aspect of the present disclosure, in any one of the first to third aspects, the sound source characteristic may include a sampling frequency. A sampling frequency may be set according to utterance performance of the utterance device.

In the method for controlling an utterance device according to a fifth aspect of the present disclosure, in any one of the first to fourth aspects, the sound source characteristic may include a sampling frequency. The sampling frequency may be set according to a frequency component that attenuates by being blocked by the utterance device due to arrangement of a speaker of the utterance device.

In the method for controlling an utterance device according to a sixth aspect of the present disclosure, in any one of the first to fifth aspects, the sound source characteristic may include a volume. A volume may be set according to a distance between the utterance device and the user. In a case where the utterance device is determined to be in an operating state, a volume may be set to be larger than that in a case where the utterance device is determined not to be in the operating state.

In the method for controlling an utterance device according to a seventh aspect of the present disclosure, in any one of the first to sixth aspects, the sound source characteristic may include at least one of a volume, a speaking speed, and a frequency component. In a case where an age of the user as an utterance target of the utterance device is determined to be a predetermined age or more, a volume may be set to be larger, a speaking speed may be set to be slower, and/or a larger number of high frequency components may be set to be included than in a case where the age is determined to be less than the predetermined age.

In the method for controlling an utterance device according to an eighth aspect of the present disclosure, in any one of the first to seventh aspects, providing an utterance sound source to the utterance device may include: setting a sound source characteristic according to the utterance device; selecting a sound source, as the utterance sound source, that has the set sound source characteristic from a plurality of sound sources; and transmitting an access destination corresponding to the utterance sound source to the utterance device so as to cause the utterance device to download the utterance sound source.

In the method for controlling an utterance device according to a ninth aspect of the present disclosure, in any one of the first to seventh aspects, providing an utterance sound source to the utterance device may include: receiving an inquiry using the set sound source characteristic from the utterance device; selecting a sound source, as the utterance sound source, that has the sound source characteristic in the inquiry from a plurality of sound sources; and transmitting an access destination corresponding to the utterance sound source to the utterance device so as to cause the utterance device to download the utterance sound source.

In the method for controlling an utterance device according to a tenth aspect of the present disclosure, in any one of the first to seventh aspects, providing an utterance sound source to the utterance device may include: selecting a plurality of candidate sound sources according to the sound source characteristic from a plurality of sound sources; transmitting access destinations corresponding to the plurality of candidate sound sources to the utterance device; and providing the utterance sound source to the utterance device, via an access destination corresponding to an utterance sound source selected from the plurality of candidate sound sources.

A server that controls an utterance device according to an eleventh aspect of the present disclosure includes a server storage and a server controller. The server storage stores sound sources providable to the utterance device (i.e. capable of being provided to the utterance device). The server controller is configured to: receive utterance source information from an information source device, set an utterance device based on the utterance source information, provide an utterance sound source that has a sound source characteristic according to the utterance device to the utterance device, and cause the utterance device to utter using the utterance sound source.

In the server that controls an utterance device according to a twelfth aspect of the present disclosure, in the eleventh aspect, the sound source characteristic may be set based on at least one of a type, an identifier, utterance performance, an operating state, a location, and a distance to a user of the utterance device; user information of a user of the utterance device; and arrangement of a speaker of the utterance device.

In the server that controls an utterance device according to a thirteenth aspect of the present disclosure, in the eleventh or twelfth aspect, the sound source characteristic may include at least one of a format of voice data, a timbre characteristic, a sound quality characteristic, a volume, and utterance content.

In the server that controls an utterance device according to a fourteenth aspect of the present disclosure, in any one of the eleventh to thirteenth aspects, the sound source characteristic may include a sampling frequency. A sampling frequency may be set according to utterance performance of the utterance device.

In the server that controls an utterance device according to a fifteenth aspect of the present disclosure, in any one of the eleventh to fourteenth aspects, the sound source characteristic may include a sampling frequency. The sampling frequency may be set according to a frequency component that attenuates by being blocked by the utterance device due to arrangement of a speaker of the utterance device.

In the server that controls an utterance device according to a sixteenth aspect of the present disclosure, in any one of the eleventh to fifteenth aspects, the sound source characteristic may include a volume. A volume may be set according to a distance between the utterance device and the user. In a case where the utterance device is determined to be in an operating state, a volume may be set to be larger than that in a case where the utterance device is determined not to be in the operating state.

In the server that controls an utterance device according to a seventeenth aspect of the present disclosure, in any one of the eleventh to sixteenth aspects, the sound source characteristic may include at least one of a volume, a speaking speed, and a frequency component. In a case where an age of the user as an utterance target of the utterance device is determined to be a predetermined age or more, a volume may be set to be larger, a speaking speed may be set to be slower, and/or a larger number of high frequency components may be set to be included than in a case where the age is determined to be less than the predetermined age.

In the server that controls an utterance device according to an eighteenth aspect of the present disclosure, in any one of the eleventh to seventeenth aspects, when providing an utterance sound source to the utterance device, the server controller may be further configured to: set a sound source characteristic according to the utterance device; select a sound source, as the utterance sound source, that has the set sound source characteristic from a plurality of sound sources; and transmit an access destination corresponding to the utterance sound source to the utterance device so as to cause the utterance device to download the utterance sound source.

In the server that controls an utterance device according to a nineteenth aspect of the present disclosure, in any one of the eleventh to seventeenth aspects, when providing an utterance sound source to the utterance device, the server controller may be further configured to: receive an inquiry using the set sound source characteristic from the utterance device; select a sound source, as the utterance sound source, that has the sound source characteristic in the inquiry from a plurality of sound sources; and transmit an access destination corresponding to the utterance sound source to the utterance device so as to cause the utterance device to download the utterance sound source.

In the server that controls an utterance device according to a twentieth aspect of the present disclosure, in any one of the eleventh to seventeenth aspects, when providing an utterance sound source to the utterance device, the server controller may be further configured to: select a plurality of candidate sound sources according to the sound source characteristic from a plurality of sound sources; transmit access destinations corresponding to the plurality of candidate sound sources to the utterance device; and provide the utterance sound source to the utterance device, via an access destination corresponding to an utterance sound source selected from the plurality of candidate sound sources.

An utterance device according to a twenty-first aspect of the present disclosure is an utterance device capable of making utterance, and includes a device storage and a device controller. The device storage stores at least one of a type, an identifier, utterance performance, an operating state, a location, and a distance to the user of the utterance device; user information of the user of the utterance device; and arrangement of a speaker of the utterance device. The device controller is configured to: set a sound source characteristic suitable for the utterance device based on at least one of the type, the identifier, the utterance performance, the operating state, the location, and the distance to a user of the utterance device, the user information of a user of the utterance device, and the arrangement of a speaker of the utterance device; make an inquiry to a server by using the set sound source characteristic; acquire an utterance sound source having the sound source characteristic from the server, and utter using the utterance sound source.

Further, a program according to a twenty-second aspect of the present disclosure is a program used in a terminal that communicates with the server that controls an utterance device according to any one of the eleventh to twentieth aspects or the utterance device according to the twenty-first aspect.

First Embodiment

Hereinafter, a first embodiment of a method for controlling an utterance device, a server, an utterance device, and a program according to the present disclosure will be described in detail with reference to the drawings as appropriate.

The first embodiment described below illustrates an example of the present disclosure. A numerical value, a shape, a configuration, a step, order of steps, and the like shown in the first embodiment below are merely examples, and do not limit the present disclosure. Among constituent elements in the first embodiment below, a component not recited in an independent claim indicating the most generic concept is described as an optional constituent element.

In the first embodiment described below, a variation may be shown for a specific element, and an appropriate combination of optional configurations is included for other elements, and each effect is achieved in the combined configuration. In the first embodiment, by combining configurations of variations, an effect of each of the variations can be exhibited.

In detailed description below, terms "first", "second", and the like are only used for description, and should not be understood as clearly indicating or implying relative importance or a rank of a technical feature. Features limited to "first" and "second" express or imply including one or more of these features.

FIG. 1 is a block diagram illustrating a schematic configuration of an utterance device and a server controlling an utterance device in the first embodiment. A server 10 controlling the utterance device (which may be abbreviated to the "server 10") can communicate with at least one utterance device 20 that can utter. Further, the server 10 can also communicate with a terminal device 30, and may receive a command to the utterance device 20 from the user via the terminal device 30 and control the utterance device 20 based on the command. The server 10 may receive information from at least one information source device 40 or at least one external information source 50, and cause the utterance device 20 to utter based on the received information. Hereinafter, an outline of each constituent element will be described.

<Utterance Device 20>

The utterance device 20 is a device having an utterance function. The utterance device 20 of the first embodiment includes a home appliance (utterance home appliance) having an utterance function. The home appliance is an abbreviation of an electric appliance for home. The utterance device 20 may be any type of device as long as it is an electronic device used at home, and includes, for example, an electrical appliance such as a television, a refrigerator, an air conditioner, a washing machine, a cleaning robot, an acoustic device, a lighting, a water heater, an intercom, a pet camera, and a smart speaker, used at home. The utterance device 20 may be referred to as a "consumer utterance device" or an "utterance home appliance" The utterance function is a function of uttering voice including a human language by using a speaker. The utterance function is different from a function of uttering only a sound such as a beep sound, a buzzer sound, or an alarm, which does not include a human language, and can convey more information to the user by using a human language. The utterance device 20 as an utterance home appliance is configured to exhibit home appliance functions. For example, the utterance device 20, which is an air conditioner, includes a compressor, a heat exchanger, and an indoor temperature sensor, and is configured to exhibit functions of cooling, heating, and dehumidification in a control space. Further, for example, the utterance device 20, which is a cleaning robot, includes a battery, a dust collection mechanism, a movement mechanism, and an object detection sensor, and is configured to perform cleaning while moving within a movable range.

In the embodiment of FIG. 1, the utterance device 20 includes a device storage 21 (home appliance storage) that stores information for exerting the function of the utterance device 20, a device controller 22 (home appliance controller) that controls the entire utterance device 20, a device communicator 23 (home appliance communicator) capable of communicating with the server 10 or the terminal device 30, and a speaker 24 for uttering. The utterance device 20 may include at least one of various sensors 25 to perform its function. The utterance device 20 may include a display for displaying visual information to the user. Note that, in the present disclosure, the utterance device 20 of this example will be described. However, another one of the utterance device 20 may have a similar configuration.

The device storage 21 is a recording medium that records various pieces of information and control programs, and may be a memory that functions as a work area of the device controller 22. The device storage 21 is realized by, for example, a flash memory, a RAM, other storage device, or an appropriate combination of these. The device storage 21 may store voice data or video data for utterance. The voice data or video data for utterance may be stored before shipment of the utterance device 20, may be read from another storage medium based on a command of a seller or the user in a home, or may be downloaded via the Internet based on a command of a seller or the user. Further, in description below, the voice data may be abbreviated as a "sound source".

The device controller 22 is a controller that controls the entire utterance device 20. The device controller 22 includes a general-purpose processor such as a CPU, an MPU, an FPGA, a DSP, or an ASIC that realizes a predetermined function by executing a program. The device controller 22 realizes various types of control in the utterance device 20 by calling and executing a control program stored in the device storage 21. Further, the device controller 22 can read/write data stored in the device storage 21 in cooperation with the device storage 21. The device controller 22 is not limited to one that realizes a predetermined function by the cooperation of hardware and software, and may be a hardware circuit specially designed to realize a predetermined function.

The device controller 22 can receive various setting values (for example, a set temperature of an air conditioner, a display channel of a television, and cleaning time of a cleaning robot) by the user via a setting user interface. The device controller 22 controls each component of the utterance device 20 so as to exhibit a home appliance function of the utterance device 20, based on these setting values, a detection value (for example, indoor temperature, presence or absence of an object) received from various ones of the sensors 25, and the like. The device controller 22 may receive a command from the server 10 or the terminal device 30 and control the utterance device 20 according to the command. Further, the device controller 22 performs utterance in accordance with a command from the server 10, based on a method of controlling an utterance device to be described later.

The device communicator 23 can also communicate with the server 10, the terminal device 30 of the user, and the like, and can also transmit and receive an Internet packet, for example. When cooperating with the server 10 via the device communicator 23, the device controller 22 can receive a parameter value or a command related to utterance from the server 10 via the Internet.

The speaker 24 converts an electric signal into an acoustic signal by using voice data designated by the device controller 22 and emits the acoustic signal into a space as a sound wave. The speaker 24 may also communicate with the device controller 22 via a voice interface. The speaker 24 can be appropriately provided based on a type or the like of the utterance device 20. For example, in the utterance device 20 that is a television, the speakers 24 may be provided on both sides of the front of the television. In the utterance device 20 that is a cleaning robot, the speaker 24 can be provided in a housing of the cleaning robot. The speakers 24 of the utterance devices 20 may have different criterion or utterance capability and vocal power. For example, the speaker 24 of the television may have a relatively high utterance and utterance ability, while the speaker 24 of a washing machine may have a relatively low utterance and utterance ability. The present disclosure does not limit the utterance and utterance ability of the speaker 24.

The utterance device 20 may include a display. The display is for displaying visual information to the user. The display may be, for example, a display with high resolution for displaying clear video like a screen of a television, or may be a panel display with low resolution for displaying a user interface (UI) for setting in a washing machine or a microwave oven. The present disclosure does not limit display ability of the display. Further, the display may be a touch panel having a display function.

The sensor 25 is for acquiring various pieces of information from the outside of the utterance device 20 in order to exhibit a function of the utterance device 20. For example, the sensor 25 may be an indoor temperature sensor that detects a temperature inside a room provided with an air conditioner, an outdoor temperature sensor that detects a temperature outside a room provided with an air conditioner, an object sensor that detects the presence or absence of an object in front of a cleaning robot, an opening and closing sensor that detects whether or not the door of a refrigerator is completely closed, or the like. Information detected by the sensor 25 is input to and stored in the device storage 21, and is then used by the device controller 22 or transmitted to the terminal device 30 or the server 10.

<Terminal Device 30>

The terminal device 30 is a device related to the utterance device 20. The terminal device 30 may be, for example, a controller of the utterance device 20, or may be a controller capable of simultaneously managing and controlling a plurality of types of home appliance products. Further, the terminal device 30 may be an information terminal capable of performing data communication with the utterance device 20, for example, a smartphone, a portable phone, a mobile phone, a tablet, a wearable device, a computer, or the like in which a dedicated related application 32 is incorporated. The server 10 or the device controller 22 can acquire setting or a command input by the user via the terminal device 30. Generally, the terminal device 30 includes a display for displaying a graphical user interface (GUI). However, in a case of interacting with the user through a voice user interface (VUI), the terminal device 30 may include a speaker and a microphone instead of or in addition to a display. Note that the server 10 can execute a method of controlling the utterance device without the terminal device 30.

<Information Source Device 40>

The information source device 40 is an information source related to content uttered by the utterance device 20. The information source device 40 may be another device (home appliance) in a home where the utterance device 20 is provided. In a case where the information source device 40 is another home appliance, the information source device 40 is also referred to as an information source device in the present disclosure. The information source device may be the utterance device 20, or may be a home appliance having no utterance function. The information source device may transmit utterance source information including device information, such as an operation state of the device, to the server 10, and the server 10 may set utterance content based on the received utterance source information. Examples of the utterance source information include an activation state of the information source device, an operation mode, abnormality information, a current position, an utterance target user, a nearest user, and the like.

<External Information Source 50>

The external information source 50 is an information source that provides information regarding a service not directly involved with an utterance device, for example, weather information or information regarding a delivery status of home delivery. The server 10 may set utterance content based on information acquired from the external information source 50.

<Server 10>

The server 10 is a server that controls at least one of the utterance device 20. More specifically, the server 10 controls at least one of the utterance device 20 to utter by using voice data or video data including a human language. In one embodiment, the server 10 can be connected to at least one of the utterance device 20 via the Internet to control utterance. For a plurality of the utterance devices 20 provided in the same home, the server 10 can control a plurality of the utterance devices at a time.

The server 10 may be used for other purposes other than execution of a method for controlling an utterance device described later. For example, the server 10 may be a management server of a manufacturer of the utterance device 20 for managing the at least one of the utterance device 20 or for collecting data. Alternatively, the server 10 may be an application server. In the first embodiment, the server 10 includes a server storage 12 and a server controller 14. The server 10 may further include a server communicator 16 for communicating with the utterance device 20, the terminal device 30, the information source device 40, or the external information source 50.

<Server Storage 12>

The server storage 12 is a recording medium that records various pieces of information and control programs, and may be a memory that functions as a work area of the server controller 14. The server storage 12 is realized by, for example, a flash memory, a solid state device (SSD), a hard disk, a RAM, another storage device, or a combination of these as appropriate. The server storage 12 may be a memory inside the server 10, or may be a storage device connected to the server 10 by wireless communication or wired communication.

The server storage 12 stores voice data or video data for utterance. The voice data or the video data for various utterances may be generated according to a type of the utterance device 20 to be subjected to utterance control, utterance source information including home appliance information of the utterance device 20, a type of the information source device 40, a type of the external information source 50, information acquired from the information source device 40 or the external information source 50, and the like. In one embodiment, before causing the utterance device 20 to utter, the server 10 generates voice data or video data for utterance in advance and stores the data in the server storage 12. In another embodiment, the server 10 generates voice data or video data for utterance dynamically (at the time of execution) immediately before utterance, and stores the data in the server storage 12. The server storage 12 may store material data for generating the voice data or the video data, or intermediate data.

<Server Controller 14>

The server controller 14 of the server 10 is a controller that controls the entire server 10. The server controller 14 includes a general-purpose processor such as a CPU, an MPU, a GPU, an FPGA, a DSP, or an ASIC that realizes a predetermined function by executing a program. The server controller 14 realizes various types of control in the server 10 by calling and executing a control program stored in the server storage 12. Further, the server controller 14 can read/write data stored in the server storage 12 in cooperation with the server storage 12. The server controller 14 is not limited to one that realizes a predetermined function by the cooperation of hardware and software, and may be a hardware circuit specially designed to realize a predetermined function.

<Server Communicator 16>

The server communicator 16 can also transmit and receive an Internet packet to and from, that is, communicate with the utterance device 20, the terminal device 30, the information source device 40, the external information source 50, and the like in cooperation with the server controller 14. For example, the server 10 may receive a command from the terminal device 30 via the server communicator 16, may transmit an instruction to the utterance device 20, or may receive information from the information source device 40 or the external information source 50. The server communicator 16 or the device communicator 23 may perform communication according to a standard such as Wi-Fi (registered trademark), IEEE 802.2, IEEE 802.3, 3G, or LTE with the server 10, the utterance device 20, the terminal device 30, the information source device 40, and the external information source 50 to transmit and receive data. The server communicator 16 or the device communicator 23 may perform communication with an intranet, an extranet, a LAN, an ISDN, a VAN, a CATV communication network, a virtual dedicated network, a telephone line network, a mobile communication network, a satellite communication network or the like, infrared light, and Bluetooth (registered trademark), in addition to the Internet.

<Method for Controlling Utterance Device>

Figure 2:
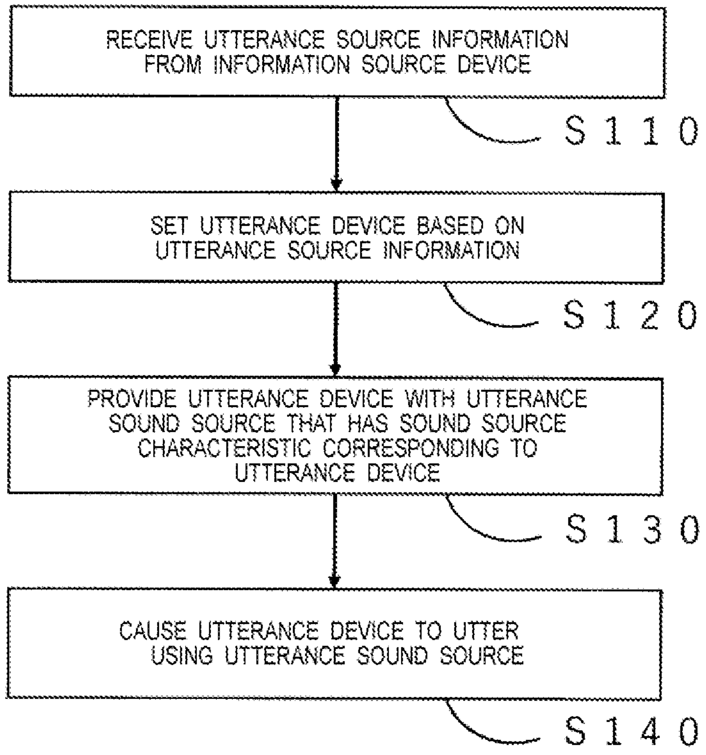
FIG. 2 is a flowchart of an example of a method for controlling an utterance device in the first embodiment.
Figure 3:
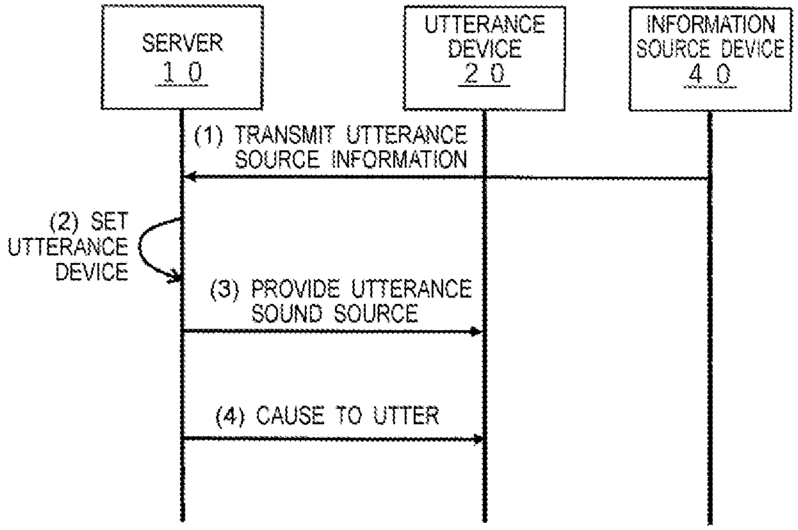
FIG. 3 is a sequence diagram of an example of the method for controlling an utterance device in the first embodiment.

The server 10 executes a method of controlling the utterance device 20 by using the server storage 12 and the server controller 14. The method causes the utterance device 20 to utter by using an utterance sound source that has a sound source characteristic corresponding to the utterance device 20, so that the user can easily hear the utterance. FIG. 2 is a flowchart of the method for controlling an utterance device in the first embodiment, and the method for controlling an utterance device includes Steps S110 to S140 below. FIG. 3 is a sequence diagram of an example of the method for controlling an utterance device in the first embodiment.

The server controller 14 of the server 10 receives utterance source information from the information source device 40 (Step S110). For example, the server controller 14 may receive utterance source information on an activation state of the information source device 40, an operation mode, abnormality information, a current position, an utterance target user, a nearest user, and the like. Then, the server controller 14 sets the utterance device 20 based on the utterance source information (Step S120).

In one embodiment, the server storage 12 stores a collation table including an utterance condition under which an utterance function can be activated and including a scenario corresponding to the utterance condition. Each scenario may include a scenario identifier, a scenario type, a scenario name, utterance content, the utterance device 20 to utter, and the like. Further, each scenario may include utterance priority, presence or absence of re-execution, a re-execution interval, an upper limit of the number of times of re-execution, and the like. The server controller 14 collates the received utterance source information with each utterance condition, and determines whether or not the utterance condition is satisfied. The server controller 14 can acquire a condition and a scenario corresponding to the utterance source information by such collation.

Note that the server controller 14 may associate a specific scenario with a specific one of the utterance device 20 based on user input. When an utterance condition of a certain scenario is satisfied, the server controller 14 may cause the utterance device 20 associated with the scenario to utter. Further, the server controller 14 may associate a specific one of the information source device 40 with a specific one of the utterance device 20. In a case where the server controller 14 determines to utter based on the utterance source information from a certain one of the information source device 40, the server controller may cause the utterance device 20 associated with the information source device 40 to utter.

For example, the information source device 40 of a "washing machine" and the utterance device 20 of a "pet camera" can be associated with each other based on user input. In a case where information that washing is finished is received from the "washing machine", the server controller 14 may cause a target device of the "pet camera" to utter utterance content "washing is finished".

In one embodiment, the server controller 14 receives external information from the external information source 50 in Step S110. In Step S120, an utterance device is set based on the external information or based on both utterance source information and the external information. For example, in a case of receiving information that washing is finished from the information source device 40 of the "washing machine", and further receiving information of a rain forecast from the external information source 50, the server controller 14 may cause a target device of the "pet camera" to utter utterance content that "Washing is finished. The weather will be bad later according to a forecast."

Next, as will be described later, the server controller 14 provides the utterance device 20 with an utterance sound source that has a sound source characteristic corresponding to the utterance device 20 (Step S130). Next, the server controller 14 causes the utterance device 20 to utter using an utterance sound source (Step S140). In one embodiment, the server controller 14 causes the utterance device 20 to download an utterance sound source stored in the server storage 12 from the server storage 12, so as to provide the utterance sound source to the utterance device 20.

More specifically, the server controller 14 may set a sound source characteristic based on at least one of a type of the utterance device 20, an identifier of the utterance device 20, utterance performance of the utterance device 20, an operating state of the utterance device 20, a location of the utterance device 20, and a distance between the utterance device 20 and the user. Further, the server 10 may set a sound source characteristic based on at least one of user information of the user of the utterance device 20 and arrangement of the speaker 24 of the utterance device 20.

The sound source characteristic may include at least one of a format of voice data (for example, WAV, MP3, AAC, MPEG-4, and FLAC), a timbre characteristic, a sound quality characteristic, a volume, and utterance content.

The timbre characteristic may include at least one of gender, an age, a voice type (for example, high, low, clear voice, or husky voice), a speaking speed (for example, slow, or normal), and a frequency component (for example, usually a larger number of high frequency components, or a larger number of low frequency components) of a voice character. In one embodiment, a voice character refers to a character that utters in voice synthesis (also referred to as text-to-speech (TTS)). In a case where utterance of a natural person is employed for voice data, the voice character refers to a natural person who utters. Note that a frequency component in the present disclosure particularly refers to a frequency component within an audible range.

The sound quality characteristic may include at least one of a sampling frequency (for example, 8 kHz, 16 kHz, 32 kHz, 48 kHz, high sampling frequency, medium sampling frequency, or low sampling frequency) and a sampling bit rate (for example, 8 bits, 16 bits, or 24 bits, and also referred to as a quantization bit rate).

The utterance content may include at least one of text, a language (for example, Japanese or English), and a scenario type.

Hereinafter, how the server controller 14 sets a sound source characteristic according to the utterance device 20 will be described by using various cases.

<Case 1>

In Case 1, the sound source characteristic includes a sampling frequency. The server controller 14 sets a sampling frequency according to utterance performance of the utterance device 20. For example, if utterance performance of the utterance device 20 of a "smart speaker" can support only a sampling frequency of 8 kHz, the server controller 14 sets a sampling frequency to "8 kHz" or "low". In contrast, in a case where utterance performance of the utterance device 20 of a "cleaning robot" can support up to a sampling frequency of 16 kHz, the server controller 14 sets a sampling frequency to be higher than the sampling frequency set for the "smart speaker" so that utterance can be easily heard. In this case, the server controller 14 sets the sampling frequency to "16 kHz" or "medium". Note that, in a case where utterance performance of the utterance device 20 can be identified from a type or an identifier of the utterance device 20, the server controller 14 may set the sampling frequency according to the type or identifier of the utterance device 20.

<Case 2>

In Case 2, the sound source characteristic includes a sampling frequency. The server controller 14 can correct details of the sampling frequency according to the arrangement of the speaker 24 of the utterance device 20. In a case of arrangement in which the speaker 24 of the utterance device 20 is included inside a housing of the utterance device 20, a specific frequency component may be blocked by the housing and attenuated. The server controller 14 may determine arrangement of the speaker 24 of the utterance device 20 based on a type, an identifier (product number), or a name of the utterance device 20. In a case where the server controller 14 determines that the speaker 24 is blocked because of its arrangement, the server controller 14 sets the sampling frequency according to a frequency component, that is attenuated by being blocked by the utterance device 20 due to arrangement of the speaker 24 of the utterance device 20. More specifically, the sampling frequency may be set so as to compensate for a frequency component that is blocked and attenuated by the housing of the utterance device 20, for example, so that a large amount of the frequency component is included.

Further, the server controller 14 may set another sound source characteristic depending on arrangement of the speaker 24. For example, the speaker 24 of the utterance device 20 of a "refrigerator" or a "washing machine" is preferably generally arranged outside the utterance device 20, whereas for the utterance device 20 of a "cleaning robot", the speaker 24 is preferably arranged inside a housing since there is a high possibility that the outer side of the utterance device 20 comes into contact with an obstacle or dust. In a case where an arranged position (i.e. arrangement) of the speaker 24 is inside an utterance device, as compared with a case where the disposed position is outside, the utterance may be partially blocked by a housing and hardly heard. Therefore, it is preferable to increase the volume. In order to utter easier to hear, the server controller 14 may set a sampling frequency relatively higher than a sampling frequency set to the utterance device 20 of a "refrigerator" or a "washing machine" to the utterance device 20 of a "cleaning robot" incorporating the speaker 24, and set the sampling frequency to, for example, "16 kHz" or "medium".

<Case 3>

In Case 3, the sound source characteristic includes a volume. The utterance device 20 acquires a distance to the user by a human sensor, Bluetooth connection, GPS technology, or the like, and transmits the distance to the server 10. The server controller 14 sets a volume according to the distance between the utterance device 20 and the user. The server controller 14 may set a volume to be larger as the distance between the utterance device 20 and the user is larger, so that the user can easily hear utterance. For example, two distance thresholds of one meter and three meters are provided, and when the distance between the utterance device 20 and the user is less than one meter, one meter or more and less than three meters, or three meters or more, the server controller 14 sets the volume to "small", "medium", and "large", respectively.

Alternatively, the utterance device 20 may transmit whether or not the utterance device 20 itself is in an operating state to the server 10, and the server controller 14 may set a volume according to whether or not the utterance device 20 is in operation. Specifically, while in operation, the utterance device 20 periodically notifies the server 10 that the utterance device 20 is in the operating state. In a case of determining that the utterance device 20 is in the operating state by the notification, the server controller 14 sets the volume to be larger than that in a case of determining that the utterance device 20 is not in the operating state. In general, since the utterance device 20 emits an operating sound during operation, it is preferable to set the volume to be relatively large. For example, the server controller 14 sets the volume to "medium" in a case of determining that the utterance device 20 is being on standby or being charged, and sets the volume to "large" in a case of determining that the utterance device 20 is in the operating state.

<Case 4>

In Case 4, the sound source characteristic includes at least one of a volume, a speaking speed, and a frequency component. The server controller 14 may set these sound source characteristics according to the user of the utterance target of the utterance device 20. In one embodiment, the server controller 14 determines whether or not the utterance device 20 is associated with a specific user (that is, whether or not a specific user is registered for the utterance device 20) according to a collation table stored in the server storage 12. In a case of determining that there is an associated user, the server controller 14 sets this user as the user of the utterance target. In another embodiment, the utterance device 20 identifies the nearest user by a human sensor, Bluetooth connection, GPS technology, or the like, and transmits information regarding the user to the server 10. The server controller 14 sets the nearest user as the user of the utterance target.

The server controller 14 sets a volume, a speaking speed, and/or a frequency component according to the age of the user as the utterance target of the utterance device 20. Specifically, in a case of determining that the age of the user as the utterance target of the utterance device 20 is a predetermined age or more, as compared with a case of determining that the age is less than the predetermined age, the server controller 14 sets the volume to be large, sets the speaking speed to be slow, and/or sets a large number of high frequency components to be included. In general, for an aged user, it is easier to hear as the volume is increased, the speaking speed is slowed down, or the frequency is increased. For example, in a case where it is determined that the user is under a predetermined age, for example, under 70 years old, the server controller 14 sets the volume to "medium" and sets the speaking speed and the frequency component to "normal". In contrast, in a case of determining that the identified user as the utterance target is at the predetermined age and more, for example, 70 years old or more, the server controller 14 sets the volume to "medium", sets the speaking speed to "slower", and sets the frequency component to "a larger number of high frequency components", so that the utterance can be heard well by the user at the predetermined age or more.

<Case 5>

The server controller 14 may set a sound source characteristic based on a location of the utterance device 20. For example, in a case where a location of the utterance device 20 is a place where the user stays for a relatively short time, such as a bathroom or a dressing room, the distance from the user is often large, and thus, the volume may be set to be large or a larger number of high frequency components may be set for easy hearing.

<Program Used in Terminal Communicating with Server 10 Controlling Utterance Device>

A terminal that communicates with the server 10, for example, the utterance device 20 has a program used to execute the control method as described above.

In a case where a program for executing utterance control is used for the utterance device 20, the program is stored in the device storage 21. The device controller 22 executes the program to utter using an utterance sound source provided by the server 10 and realize a function of utterance control.

In this manner, the server controller 14 completes processing of utterance control. The server controller 14 sets a sound source characteristic according to the utterance device 20 based on various pieces of information regarding the utterance device 20 and the user. For example, by setting the timbre characteristic or the sound quality characteristic higher than usual, the utterance of the utterance device 20 can be made easier to hear. Alternatively, by setting utterance content that is easier for the user to hear, the utterance of the utterance device 20 can be made easier to hear.

Second Embodiment

<Case where Server 10 Sets Sound Source Characteristic>

In a second embodiment, the server 10 sets a sound source characteristic according to the utterance device 20, and causes the utterance device 20 to download an utterance sound source having the set sound source characteristic, so as to provide an utterance sound source.

Figure 4:
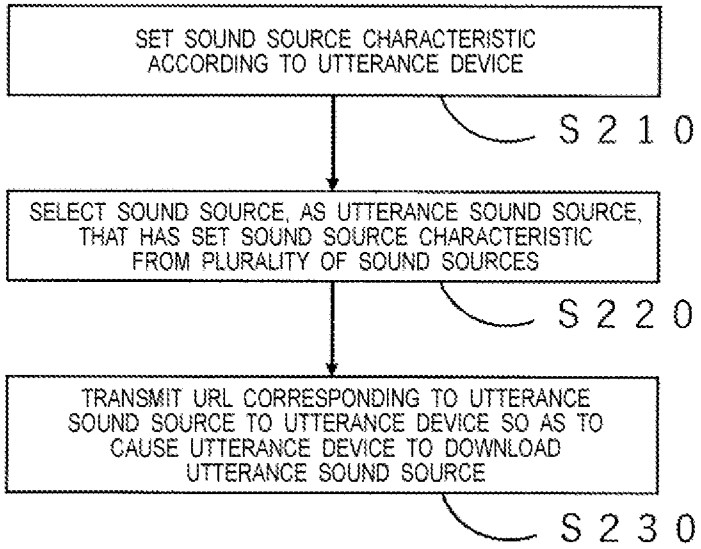
FIG. 4 is a flowchart of an example of Step S130 in a second embodiment.
Figure 5:
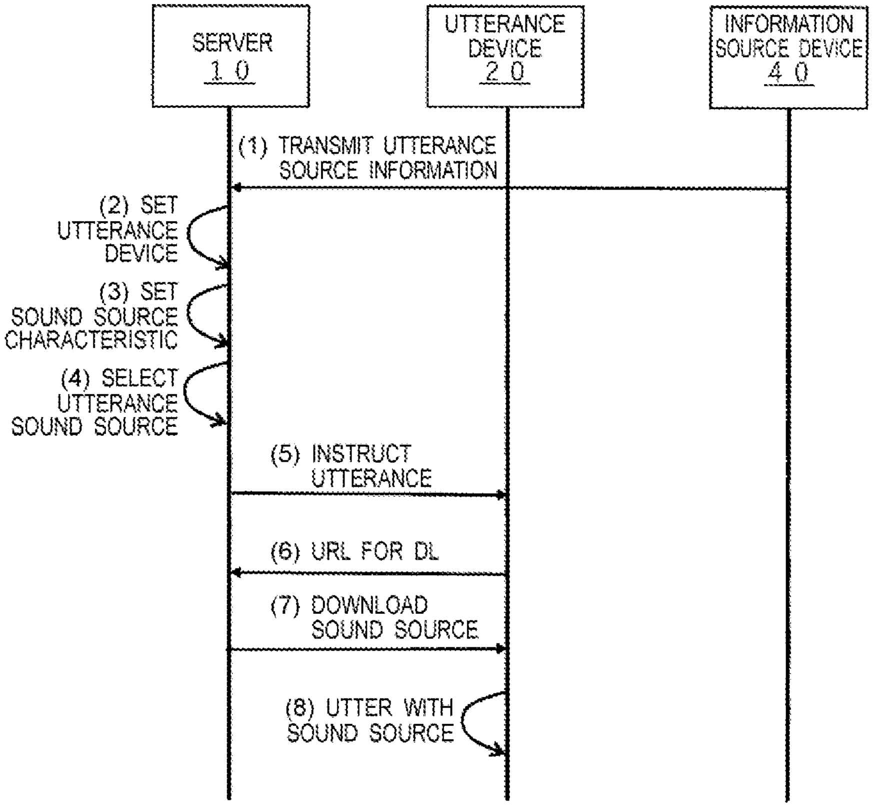
FIG. 5 is a sequence diagram of an example of the method for controlling an utterance device in the second embodiment.

FIG. 4 is a flowchart of an example of Step S130 in the second embodiment. FIG. 5 is a sequence diagram of an example of the method for controlling an utterance device in the second embodiment. The server controller 14 sets a sound source characteristic according to the utterance device 20 set in Step S120 (FIG. 2) (Step S210). As in the first embodiment, the server controller 14 may set the sound source characteristic based on at least one of a type, an identifier, utterance performance, an operating state, a location, and a distance to the user of the utterance device 20; user information; and arrangement of the speaker 24.

The server controller 14 selects a sound source having the set sound source characteristic from a plurality of sound sources as an utterance sound source (Step S220). In one embodiment, the server controller 14 selects an utterance sound source from a plurality of sound sources already stored in the server storage 12. In another embodiment, the server controller 14 dynamically generates a sound source according to the set sound source characteristic, and selects the generated sound source as an utterance sound source.

Next, the server controller 14 transmits an access destination corresponding to the utterance sound source, for example, a uniform resource locator (URL) corresponding to the utterance sound source, to the utterance device 20 so as to cause the utterance device 20 to download the utterance sound source (Step S230). The utterance device 20 downloads the utterance sound source by using the received access destination, and utters.

Hereinafter, the provision of an utterance sound source will be described using an example in which a URL is used as an access destination. In one embodiment, the server controller 14 may set a URL based on a type, a scenario, an utterance character, sound quality (sampling frequency and the like), a format of a sound source, a storage position of a sound source in the server storage 12, a version of a sound source, and the like of the information source device 40 serving as an utterance condition. As an example, the URL may be set according to a format "https://serverURL/v1/deviceType/scenarioId/scenarioId_characterName_voiceQuality.extension". For example, a URL corresponding to a sound source created with an utterance character "Mizuki" and a low sampling frequency, and used for a scenario regarding the information source device 40 of a "washing machine", is set to "https://serverURL/v1/washerDryer/washerDryer.dryingFinished/washerDryer.dryingFinished_Mizuki_low.wav".

Various sound sources that may be set as an utterance sound source are stored in the server 10, and the utterance device 20 downloads an utterance sound source immediately before utterance, so that the server 10 can easily update a sound source. That is, the server 10 can update a stored sound source or dynamically generate an utterance sound source, and can flexibly provide an utterance sound source.

In another embodiment, the server controller 14 provides an utterance sound source by transmitting the utterance sound source itself to the utterance device 20. In still another embodiment, voice data corresponding to various sound source characteristics is already stored in the device storage 21, and the server controller 14 transmits a set sound source characteristic to the utterance device 20. The utterance device 20 selects corresponding voice data based on a received sound source characteristic and utters.

According to the method for controlling an utterance device, the server, the utterance device, and the program of the second embodiment, it is possible to set a sound source characteristic easy for the user to hear according to an utterance device, and it is possible to easily and flexibly provide an utterance sound source.

Third Embodiment

<Case where Server 10 Includes Plurality of Servers>

In a third embodiment, the server 10 includes a plurality of servers having different roles.

Figure 6:
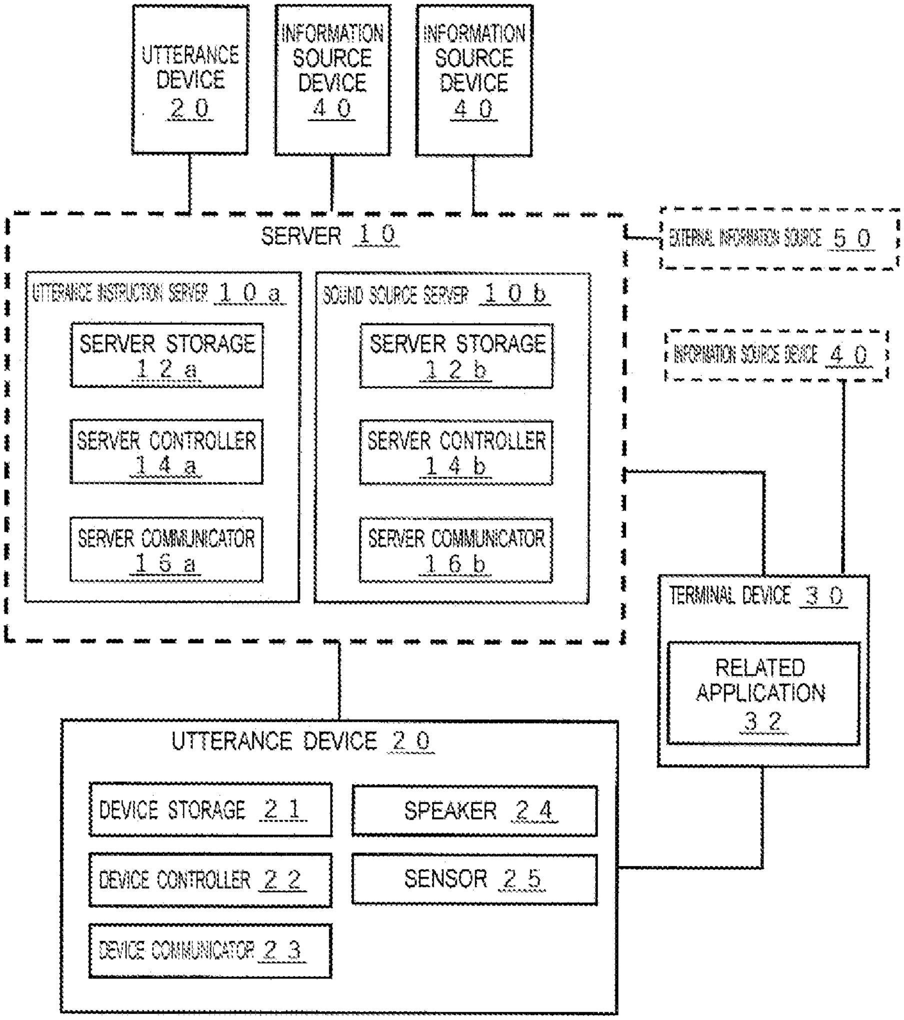
FIG. 6 is a block diagram illustrating a schematic configuration of the utterance device and the server that controls an utterance device in a third embodiment.

FIG. 6 is a block diagram illustrating a schematic configuration of the utterance device and the server that controls an utterance device in the third embodiment. In the third embodiment, the server 10 includes an utterance instruction server 10*a* and a sound source server 10*b*. The utterance instruction server 10*a* includes a server storage 12*a*, a server controller 14*a*, and a server communicator 16*a*.

The sound source server 10*b* includes a server storage 12*b*, a server controller 14*b*, and a server communicator 16*b*. In the method for controlling an utterance device, the sound source server 10*b* performs operation related to generation, storage, and download of voice data (sound source) for utterance. In contrast, the utterance instruction server 10*a* performs remaining operation, for example, communication between the utterance device 20 and the terminal device 30.

Figure 7:
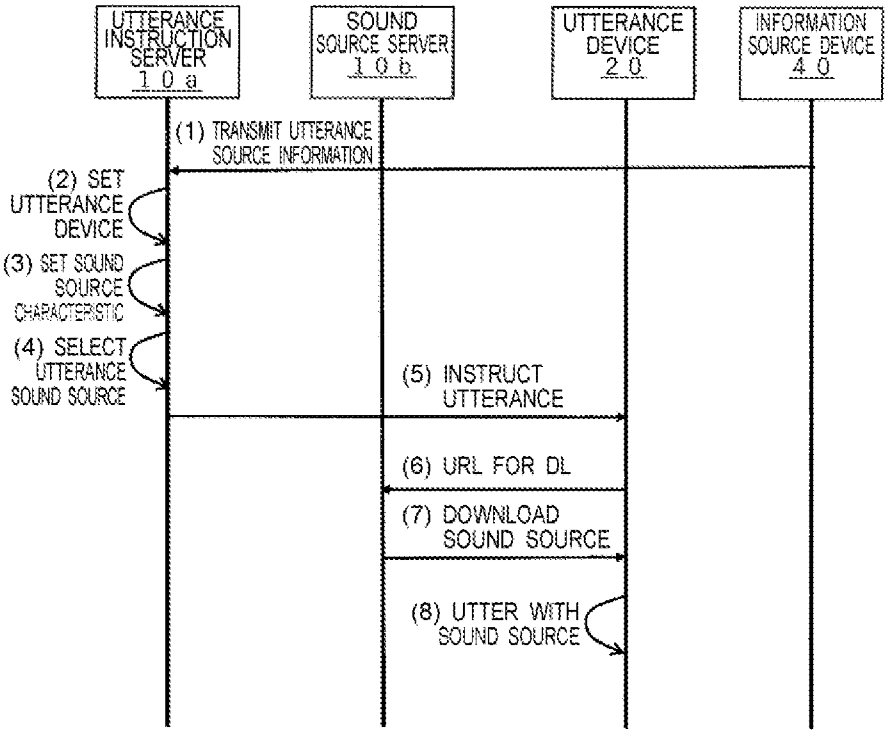
FIG. 7 is a sequence diagram of an example of the method for controlling an utterance device in the third embodiment.

FIG. 7 is a sequence diagram of an example of the method for controlling an utterance device in the third embodiment, which is executed by the configuration illustrated in FIG. 6. The utterance instruction server 10*a* receives utterance source information from the information source home appliance 40, sets the utterance device 20 and a sound source characteristic, selects an utterance sound source, and transmits an utterance instruction to the utterance device 20. In the embodiment of FIG. 7, the utterance sound source is stored in the server storage 12*b* of the sound source server 10*b*, and the utterance instruction includes a URL for downloading the sound source ("URL for DL"). When receiving the utterance instruction, the utterance device 20 downloads the utterance sound source from the sound source server 10*b* based on the URL for DL, and utters with the utterance sound source.

In this manner, processing load on each server in the server 10 can be reduced. Further, each of the servers 10 only needs to have a configuration for performing corresponding operation, and for example, the utterance instruction server 10*a* does not need to include hardware for generating a sound source. This configuration facilitates retention and maintenance of the entire server 10.

Note that a function of the server 10 may be shared by a plurality of servers from a viewpoint different from those in FIGS. 6 and 7. For example, the server 10 may include an utterance instruction server, a sound source generation server, and a sound source distribution server. In this case, the utterance sound source generated by the sound source generation server is stored in the server storage of the sound source distribution server and downloaded by the utterance device 20.

Fourth Embodiment

<Case where Utterance Device 20 Sets Sound Source Characteristic>

In a fourth embodiment, the utterance device 20 sets a sound source characteristic, and inquires the server 10 about a sound source having the set sound source characteristic (requests the sound source from the server 10). The server controller 14 selects an utterance sound source that has a sound source characteristic based on the inquiry from the utterance device 20, and provides the selected utterance sound source to the utterance device 20.

Figure 8:
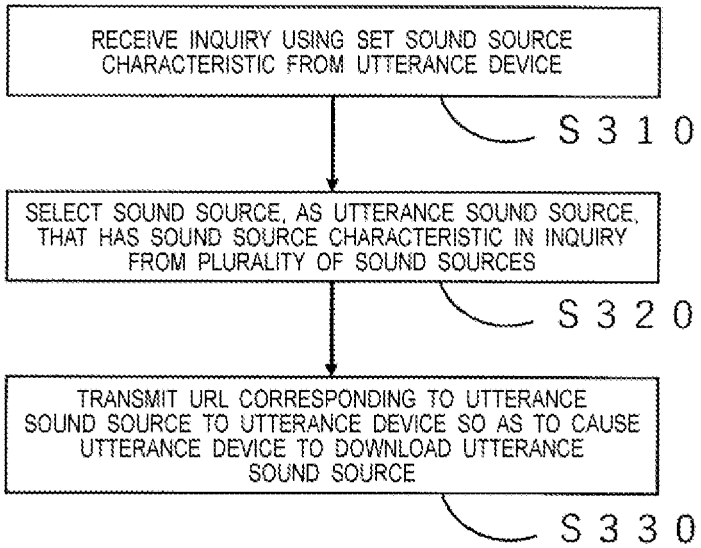
FIG. 8 is a flowchart of an example of Step S130 in a fourth embodiment.
Figure 9:
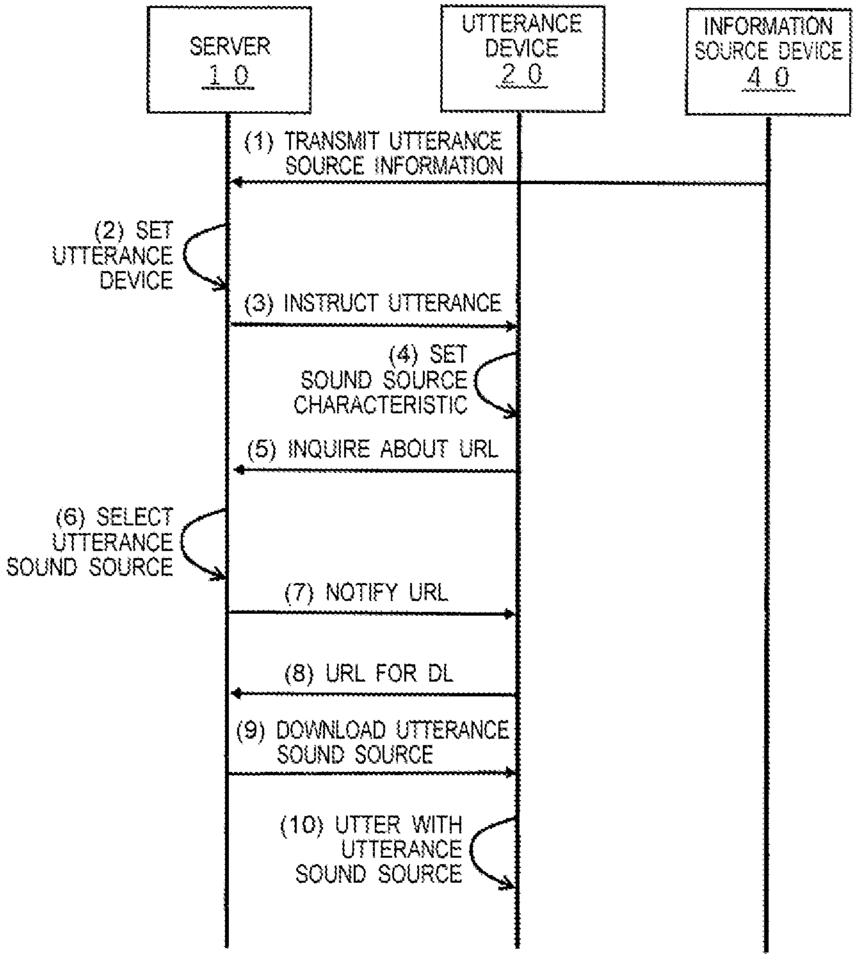
FIG. 9 is a sequence diagram of an example of the method for controlling an utterance device in the fourth embodiment.

FIG. 8 is a flowchart illustrating an example of Step S130 performed by the server 10 in the fourth embodiment. Steps 310 to 330 in FIG. 8 are one specific example of Step S130. FIG. 9 is a sequence diagram of an example of the method for controlling an utterance device in the fourth embodiment. As will be described later, the server controller 14 provides an utterance sound source to the utterance device 20 in a process illustrated in FIGS. 8 and 9.

Figure 10:
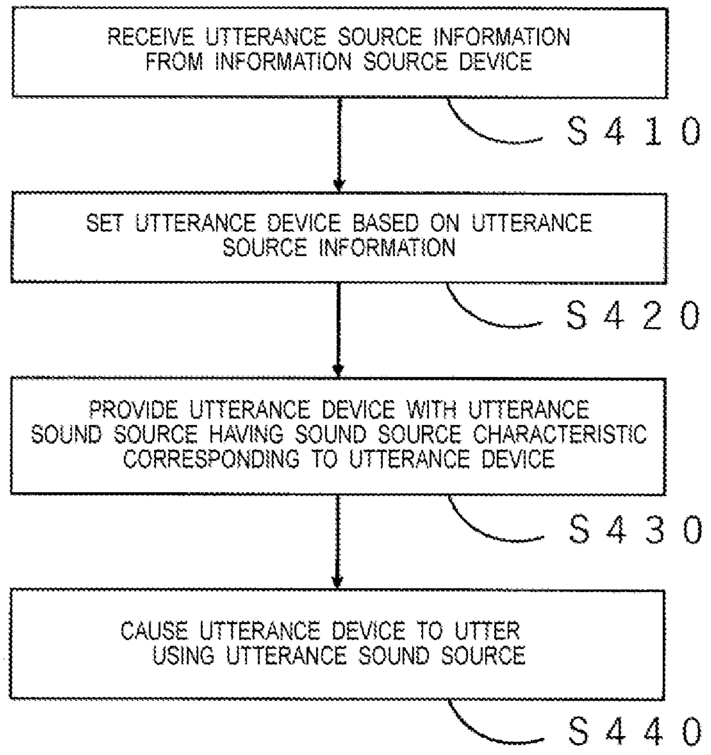
FIG. 10 is a flowchart of an example of the method for controlling an utterance device in the fourth embodiment.

FIG. 10 is a flowchart illustrating an example of a method performed by the utterance device 20 in the fourth embodiment. The device storage 21 of the utterance device 20 stores at least one of a type, an identifier, utterance performance, an operating state, a location, and a distance to the user of the utterance device 20 described above; user information of the user of the utterance device 20; and arrangement of the speaker 24 of the utterance device 20. The device controller 22 of the utterance device 20 is configured to execute the flowchart in FIG. 10.

In the method for controlling an utterance device, first, the server controller 14 receives utterance source information and sets the utterance device 20 (Steps S110 and S120 in FIG. 2). After setting the utterance device 20, the server controller 14 transmits an utterance instruction to the utterance device 20 so as to notify the utterance device 20 that the utterance device 20 should utter. An utterance instruction of the present embodiment includes information necessary for the device controller 22 to set a sound source characteristic, and may include, for example, utterance source information, or, an utterance condition based on utterance source information or a corresponding scenario. As in the first embodiment described above, by using information included in an utterance instruction, the device controller 22 sets a sound source characteristic suitable for the utterance device 20 based on at least one of a type, an identifier, utterance performance, an operating state, a location, a distance to the user of the utterance device 20; user information; and arrangement of the speaker 24 (Step S410).

By using the set sound source characteristic, the device controller 22 inquires of the server 10 to acquire a sound source (utterance sound source) having the sound source characteristic (Step S420). More specifically, the device controller 22 inquires about a URL of a sound source having the sound source characteristic. In response to this, the server controller 14 receives an inquiry using the sound source characteristic set by the device controller 22 from an utterance device (Step S310).

The server controller 14 selects a sound source that has a sound source characteristic in the inquiry as an utterance sound source from a plurality of sound sources stored in the server storage 12 (Step S320). Then, the server controller 14 transmits a URL ("URL for DL") corresponding to the utterance sound source to an utterance device so as to cause the utterance device to download the utterance sound source (Step S330). In response to this, the device controller 22 acquires the utterance sound source that has the sound source characteristic from the server 10 (Step S430). Specifically, the device controller 22 downloads the utterance sound source by using the notified URL ("URL for DL"). After the above, the device controller 22 utters by using the speaker 24 and the utterance sound source (Step S440).

In a case where a program for executing utterance control is used for the utterance device 20, the program is stored in the device storage 21. The device controller 22 realizes a function of utterance control by executing the program. In one embodiment, the device controller 22 controls the utterance device 20 as illustrated in FIG. 10 by executing the program.

According to the method for controlling an utterance device, the server, the utterance device, and the program of the fourth embodiment, the utterance device 20 can set a sound source characteristic suitable for itself. That is, the utterance device 20 can be controlled to make the utterance easy to hear.

Fifth Embodiment

<Case where Server 10 Provides Plurality of Candidate Sound Sources to Utterance Device 20>

In a fifth embodiment, the server 10 provides a plurality of candidate sound sources, and the utterance device 20 selects an utterance sound source from the candidate sound sources and utters.

Figure 11:
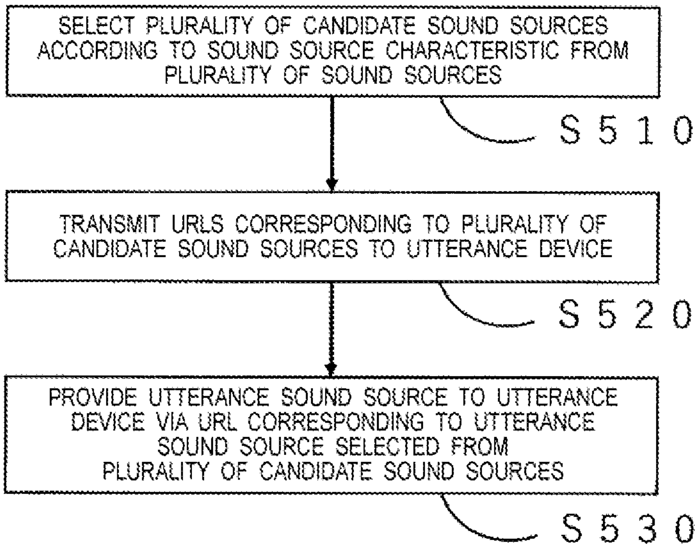
FIG. 11 is a flowchart of an example of Step S130 in a fifth embodiment.
Figure 12:
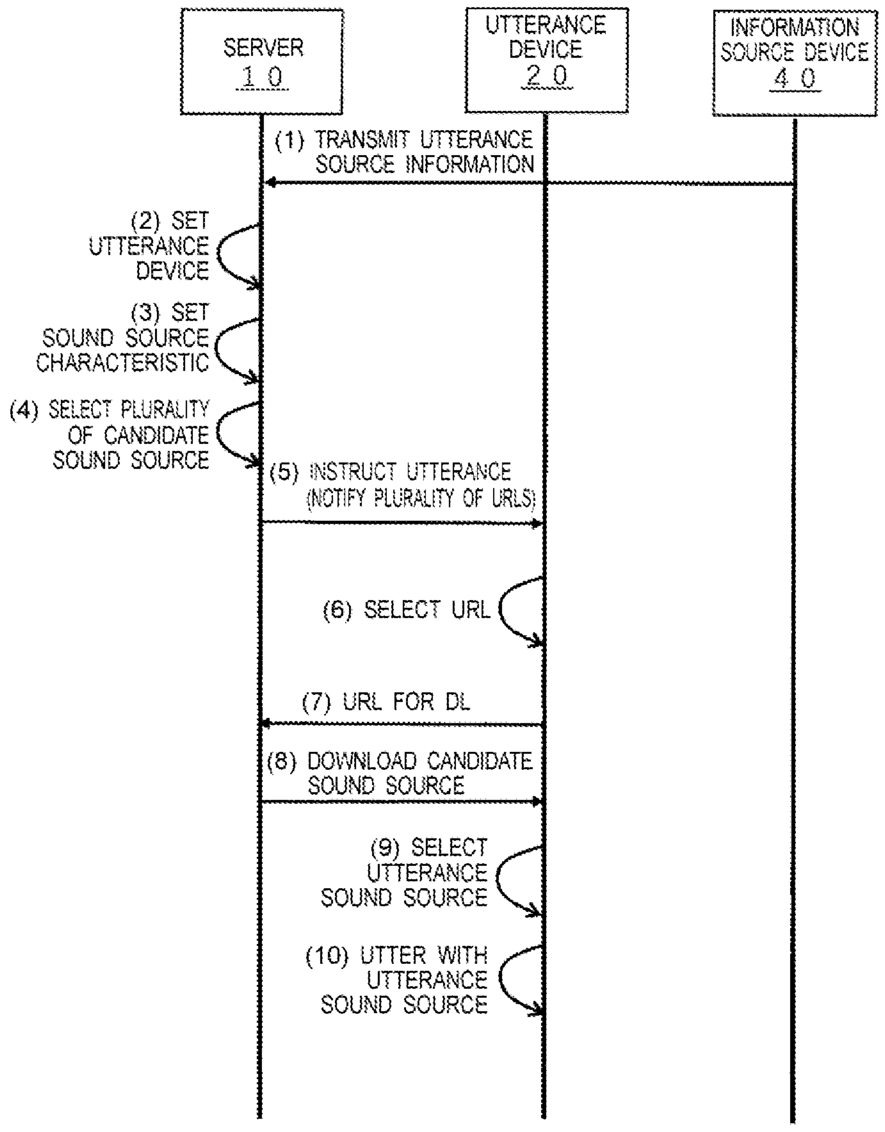
FIG. 12 is a sequence diagram of an example of the method for controlling an utterance device in the fifth embodiment.

FIG. 11 is a flowchart of an example of Step S130 in the fifth embodiment. FIG. 12 is a sequence diagram of an example of the method for controlling an utterance device in the fifth embodiment.

In the method for controlling an utterance device, first, the server controller 14 receives utterance source information and sets the utterance device 20 (Steps S110 and S120 in FIG. 2). After setting the utterance device 20, the server controller 14 selects a plurality of candidate sound sources according to a sound source characteristic from a plurality of sound sources stored in the server storage 12 (Step S510). In one embodiment, there are a plurality of sound sources having a set sound source characteristic, and the server controller 14 selects these sound sources as candidate sound sources.

In one embodiment, the server controller 14 selects a sound source that has the set sound source characteristic and a sound source that has a sound source characteristic similar to the set sound source characteristic as a candidate sound source. The similar sound source characteristic is, for example, a sound source characteristic having a value within a predetermined range from a set value of a sound source characteristic such as volume. For example, for a set sound source characteristic of “Volume: 50 dB”, a sound source having a sound source characteristic of “Volume: 40 dB” to “Volume: 60 dB” within a predetermined range of 10 dB may be selected as a candidate sound source. For example, for a set sound source characteristic of “Sampling frequency: large”, sound sources having sound source characteristics of “Sampling frequency: large” and “Sampling frequency: medium” may be selected as candidate sound sources. Further, for example, for a set sound source characteristic of “Voice character: male, young”, sound sources having sound source characteristics of “Voice character: male, young” and “Voice character: woman, young” can be selected as candidate sound sources.

The server controller 14 transmits URLs corresponding to a plurality of candidate sound sources to the utterance device 20 (Step S520). The server controller 14 provides an utterance sound source to the utterance device 20 via a URL corresponding to an utterance sound source selected from a plurality of the candidate sound sources (Step S530).

In one embodiment, the server controller 14 transmits an utterance instruction including URLs corresponding to a plurality of candidate sound sources to an utterance device. When receiving an utterance instruction including a plurality of URLs (“URLs for DL”), the device controller 22 downloads candidate sound sources using these URLs. Then, the device controller 22 selects an utterance sound source based on a sound source characteristic of the downloaded candidate sound sources, and utters with this utterance sound source.

In another embodiment, the server controller 14 transmits an utterance instruction to an utterance device, and the utterance instruction includes URLs corresponding to a plurality of candidate sound sources and includes information regarding sound source characteristics corresponding to these URLs. Upon receiving the utterance instruction including a plurality of the URLs, the device controller 22 selects a sound source characteristic to be included as an utterance sound source based on the sound source characteristics corresponding to these URLs. Then, the device controller 22 downloads an utterance sound source by using a URL corresponding to the selected sound source characteristic, and utters with the utterance sound source.

Note that, when the device controller 22 selects an utterance sound source or a sound source characteristic to be included as an utterance sound source, as in the first embodiment, setting may be made based on at least one of a type, an identifier, utterance performance, an operating state, a location, a distance to the user of the utterance device 20; user information; and arrangement of the speaker 24.

According to the method for controlling an utterance device, the server, the utterance device, and the program of the fifth embodiment, the utterance device 20 can select an utterance sound source from a plurality of provided candidate sound sources. Therefore, the server 10 can provide an utterance sound source more easily and flexibly. Further, since the utterance device 20 makes selection based on a state immediately before utterance, an utterance sound source that is easier to hear can be selected more accurately.

Sixth Embodiment

<Case of Allowing User to Set/Select Utterance Sound Source from Plurality of Candidate Sound Sources>

In a sixth embodiment, the server 10 or the utterance device 20 provides a plurality of candidate sound sources to cause the user to set/select an utterance sound source.

Figure 13:
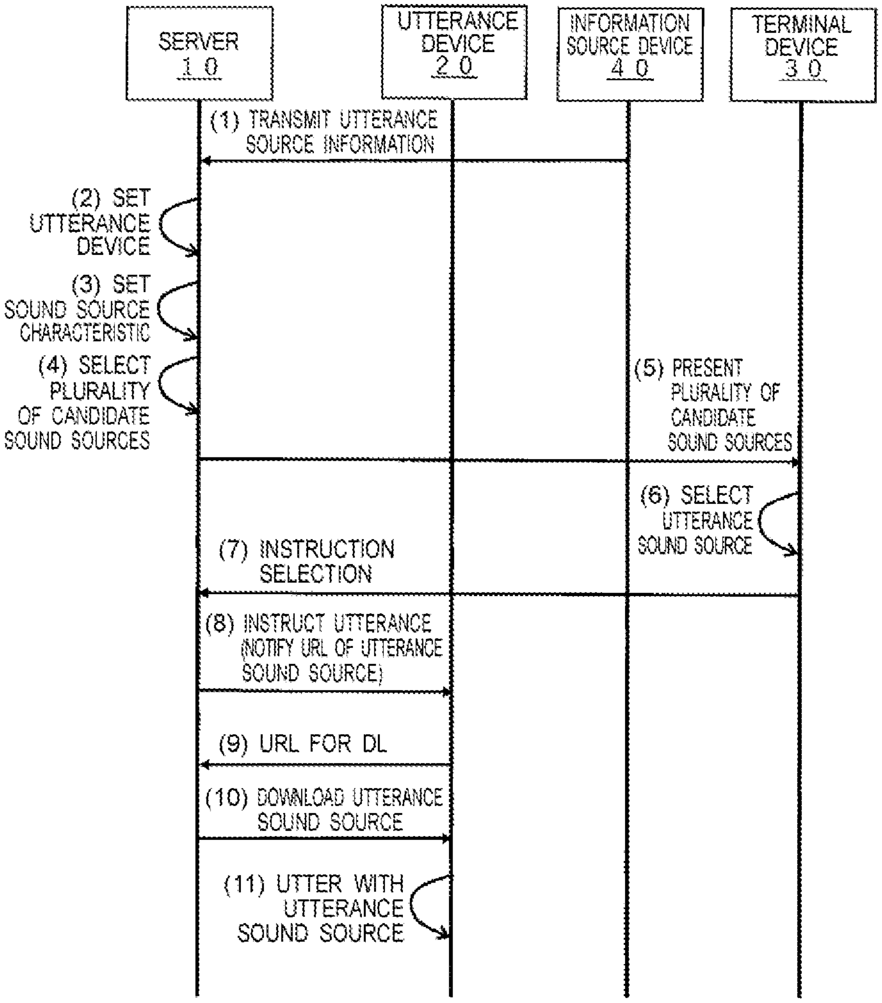
FIG. 13 is a sequence diagram of an example of the method for controlling an utterance device in a sixth embodiment.

FIG. 13 is a sequence diagram of an example of the method for controlling an utterance device in a sixth embodiment. In the sixth embodiment, an example in which the server 10 sets a sound source characteristic and causes the user to select a sound source will be described. However, the utterance device 20 may set a sound source characteristic and cause the user to select a sound source.

In the example of FIG. 13, first, utterance source information is received and the utterance device 20 is set (Steps S110 and S120 in FIG. 2). After setting the utterance device 20, the server controller 14 sets a sound source characteristic according to the utterance device 20 as in the above-described first to third embodiments, and then selects a sound source having the set sound source characteristic from a plurality of sound sources as a plurality of candidate sound sources.

Next, the server controller 14 presents information regarding a plurality of the candidate sound sources to the user via the related application 32 of the terminal device 30. The information regarding a plurality of the candidate sound sources may include a set sound source characteristic, or may include information extracted from the set sound source characteristic for better comprehension by the user. Further, the server controller 14 may cause the terminal device 30 to download a candidate sound source so that the user can select an utterance sound source after performing trial of listening of the candidate sound source.

When the user selects an utterance sound source based on information presented on the terminal device 30 or trial of listening, the terminal device 30 transmits a selection instruction including a selection result to the server 10. Based on the selection instruction, the server controller 14 provides an utterance sound source to the utterance device 20 as in the above-described first to third embodiments, and causes the utterance device 20 to utter using the utterance sound source (Steps S130 and S140 in FIG. 2).

In one embodiment, the server controller 14 sets a plurality of sound source characteristics according to the utterance device 20 as candidate characteristics, presents information regarding the candidate characteristics to the user via the terminal device 30, and causes the user to select a sound source characteristic to be employed. When receiving the selection instruction including a selection result from the terminal device 30, the server controller 14 provides an utterance sound source that has the selected sound source characteristic to an utterance device, and causes the utterance device 20 to utter using the utterance sound source.

In one embodiment, the server controller 14 sets a plurality of sound source characteristics according to the utterance device 20 as candidate characteristics, and selects a plurality of candidate sound sources having these candidate characteristics from a plurality of sound sources. The server controller 14 presents information regarding the candidate sound source to the user or causes the user to perform trial of listening of the candidate sound source via the terminal device 30, and causes the user to select an utterance sound source. When receiving a selection instruction including a selection result from the terminal device 30, the server controller 14 provides the selected utterance sound source to an utterance device, and causes the utterance device 20 to utter using the utterance sound source.

In this manner, it is possible to cause the user to select an utterance sound source or a sound source characteristic, and it is possible to provide an utterance service more in accordance with the demand of the user.

<Program Used in Terminal Communicating with Server 10 Controlling Utterance Device>

A terminal that communicates with the server 10, for example, the utterance device 20 or the terminal device 30 has a program used to execute the control method as described above. In a case where a program for executing utterance control is used for the utterance device 20, the program is stored in the device storage 21. The device controller 22 realizes a function of utterance control by executing the program.

In one embodiment, by executing the program, the device controller 22 acquires an utterance sound source corresponding to the utterance device 20 from the server 10 and utters as in any of the first to third, fifth, and sixth embodiments.

In another embodiment, the device controller 22 executes the program to perform the method for controlling an utterance device as in the fourth and sixth embodiments.

As described above, the program for functioning as the server 10 or the utterance device 20 may be stored in a computer-readable storage medium that can be read by a computer. When a computer-readable storage medium storing the program is supplied to the utterance test server 10 or the utterance device 20, a controller of these (for example, CPU, MPU, or the like) can exert its function by reading and executing the program stored in the computer-readable storage medium. As the computer-readable storage medium, a ROM, a floppy (registered trademark) disk, a hard disk, an optical disk, a magneto-optical disk, a CD-ROM, a CD-R, a magnetic tape, a non-volatile memory card, or the like can be used.

The above are merely specific embodiments of the present disclosure, and the protection scope of the present disclosure is not limited to them. The present disclosure includes content described above in the drawings and the specific embodiments described above. However, the present disclosure is not limited the content. Various disclosed embodiments or examples can be combined without departing from the scope or spirit of the present disclosure. Changes which do not depart from the functional and structural principles of the present disclosure are within the scope of the claims.

DESCRIPTION OF SYMBOLS

10 server controlling utterance device (server)
**10*a* utterance instruction server 10*a***
**10*b*** sound source server
12, **12*a*, 12*b*** server storage
14, **14*a*, 14*b*** server controller
16, **16*a*, 16*b*** server communicator
20 utterance device
21 device storage
22 device controller
23 device communicator
24 speaker
25 sensor
30 terminal device
32 related application
40 information source device
50 external information source

The invention claimed is:

1. A method for controlling an utterance device, comprising:

receiving utterance source information from an information source device;

setting an utterance device based on the utterance source information;

providing an utterance sound source that has a sound source characteristic according to the utterance device to the utterance device; and causing the utterance device to utter using the utterance sound source, wherein at least one of the following conditions (a), (b), and (c) is satisfied:

(a) the sound source characteristic includes a sampling frequency, and the sampling frequency is set according to a frequency component that attenuates by being blocked by the utterance device due to arrangement of a speaker of the utterance device;

(b) providing an utterance sound source to the utterance device includes:

receiving an inquiry using the set sound source characteristic from the utterance device;

selecting a sound source, as the utterance sound source, that has the sound source characteristic in the inquiry from a plurality of sound sources; and transmitting an access destination corresponding to the utterance sound source to the utterance device so as to cause the utterance device to download the utterance sound source; and (c) providing an utterance sound source to the utterance device includes:

selecting a plurality of candidate sound sources according to the sound source characteristic from a plurality of sound sources;

transmitting access destinations corresponding to the plurality of candidate sound sources to the utterance device; and providing the utterance sound source to the utterance device, via an access destination corresponding to an utterance sound source selected from the plurality of candidate sound sources.

2. The method for controlling an utterance device according to claim 1, wherein the sound source characteristic is set based on at least one of a type, an identifier, utterance performance, an operating state, a location, and a distance to a user of the utterance device; user information of a user of the utterance device; and arrangement of a speaker of the utterance device.

3. The method for controlling an utterance device according to claim 1, wherein the sound source characteristic includes at least one of a format of voice data, a timbre characteristic, a sound quality characteristic, a volume, and utterance content.

4. The method for controlling an utterance device according to claim 1, wherein the sound source characteristic includes a sampling frequency;

wherein a sampling frequency is set according to utterance performance of the utterance device.

5. The method for controlling an utterance device according to claim 1, wherein the sound source characteristic includes a sound volume;

wherein a volume is set according to a distance between the utterance device and a user, or in a case where the utterance device is determined to be in an operating state, a volume is set to be larger than that in a case where the utterance device is determined not to be in the operating state.

6. The method for controlling an utterance device according to claim 1, wherein the sound source characteristic includes at least one of a volume, a speaking speed, and a frequency component;

wherein in a case where an age of a user as an utterance target of the utterance device is determined to be a predetermined age or more, a volume is set to be larger, a speaking speed is set to be slower, and/or a larger number of high frequency components are set to be included than in a case where the age is determined to be less than the predetermined age.

7. The method for controlling an utterance device according to claim 1, wherein providing an utterance sound source to the utterance device includes:

setting a sound source characteristic according to the utterance device;

selecting a sound source, as the utterance sound source, that has the set sound source characteristic from a plurality of sound sources; and transmitting an access destination corresponding to the utterance sound source to the utterance device so as to cause the utterance device to download the utterance sound source.

8. A server that controls an utterance device, the server comprising:

a server storage that stores sound sources providable to the utterance device; and a server controller configured to:

receive utterance source information from an information source device, set an utterance device based on the utterance source information, provide an utterance sound source that has a sound source characteristic according to the utterance device to the utterance device, and cause the utterance device to utter using the utterance sound source, wherein at least one of the following conditions (a), (b) and (c) is satisfied:

(a) the sound source characteristic includes a sampling frequency, and the sampling frequency is set according to a frequency component that attenuates by being blocked by the utterance device due to arrangement of a speaker of the utterance device;

(b) when providing an utterance sound source to the utterance device, the server controller is further configured to:

receive an inquiry using the set sound source characteristic from the utterance device;

select a sound source, as the utterance sound source, that has the sound source characteristic in the inquiry from a plurality of sound sources; and transmit an access destination corresponding to the utterance sound source to the utterance device so as to cause the utterance device to download the utterance sound source; and (c) when providing an utterance sound source to the utterance device, the server controller is further configured to:

select a plurality of candidate sound sources according to the sound source characteristic from a plurality of sound sources;

transmit access destinations corresponding to the plurality of candidate sound sources to the utterance device; and provide the utterance sound source to the utterance device, via an access destination corresponding to an utterance sound source selected from the plurality of candidate sound sources.

9. The server that controls an utterance device according to claim 8, wherein the sound source characteristic is set based on at least one of a type, an identifier, utterance performance, an operating state, a location, and a distance to a user of the utterance device; user information of a user of the utterance device; and arrangement of a speaker of the utterance device.

10. The server that controls an utterance device according to claim 8, wherein the sound source characteristic includes at least one of a format of voice data, a timbre characteristic, a sound quality characteristic, a volume, and utterance content.

11. The server that controls an utterance device according to claim 8, wherein the sound source characteristic includes a sampling frequency;

wherein a sampling frequency is set according to utterance performance of the utterance device.

12. The server that controls an utterance device according to claim 8, wherein the sound source characteristic includes a sound volume;

wherein a volume is set according to a distance between the utterance device and a user, or in a case where the utterance device is determined to be in an operating state, a volume is set to be larger than that in a case where the utterance device is determined not to be in the operating state.

13. The server that controls an utterance device according to claim 8, wherein the sound source characteristic includes at least one of a volume, a speaking speed, and a frequency component;

wherein in a case where an age of a user as an utterance target of the utterance device is determined to be a predetermined age or more, a volume is set to be larger, a speaking speed is set to be slower, and/or a larger number of high frequency components are set to be included than in a case where the age is determined to be less than the predetermined age.

14. The server that controls an utterance device according to claim 8, wherein when providing an utterance sound source to the utterance device, the server controller is further configured to:

set a sound source characteristic according to the utterance device;

select a sound source, as the utterance sound source, that has the set sound source characteristic from a plurality of sound sources; and transmit an access destination corresponding to the utterance sound source to the utterance device so as to cause the utterance device to download the utterance sound source.

15. An utterance device capable of making utterance, comprising:

a device storage that stores at least one of a type, an identifier, utterance performance, an operating state, a location, and a distance to a user of the utterance device, user information of a user of the utterance device, and arrangement of a speaker of the utterance device; and a device controller configured to:

set a sound source characteristic suitable for the utterance device based on at least one of the type, the identifier, the utterance performance, the operating state, the location, and the distance to a user of the utterance device, the user information of a user of the utterance device, and the arrangement of a speaker of the utterance device;

make an inquiry to a server by using the set sound source characteristic;

acquire an utterance sound source that has the sound source characteristic from the server; and utter using the utterance sound source;

wherein at least one of the following conditions (a), (b), and (c) is satisfied:

(a) the sound source characteristic includes a sampling frequency, and the sampling frequency is set according to a frequency component that attenuates by being blocked by the utterance device due to arrangement of a speaker of the utterance device;

(b) the utterance sound source has the sound source characteristic which is set according to the utterance device, and the utterance sound source is selected from a plurality of sound sources, and the device controller is further configured to receive, from the server, an access destination corresponding to the utterance sound source and download the utterance sound source;

(c) the device controller is further configured to receive, from the server, access destinations corresponding to a plurality of candidate sound sources according to the sound source characteristic, and acquire the utterance sound source, via the access destinations.

* * * * *